J. H. STORTZ.
MACHINE FOR CREASING CARDBOARD.
APPLICATION FILED JULY 27, 1918.

1,307,065.

Patented June 17, 1919.
6 SHEETS—SHEET 1.

WITNESS:

INVENTOR
John H. Stortz.
BY
ATTORNEY.

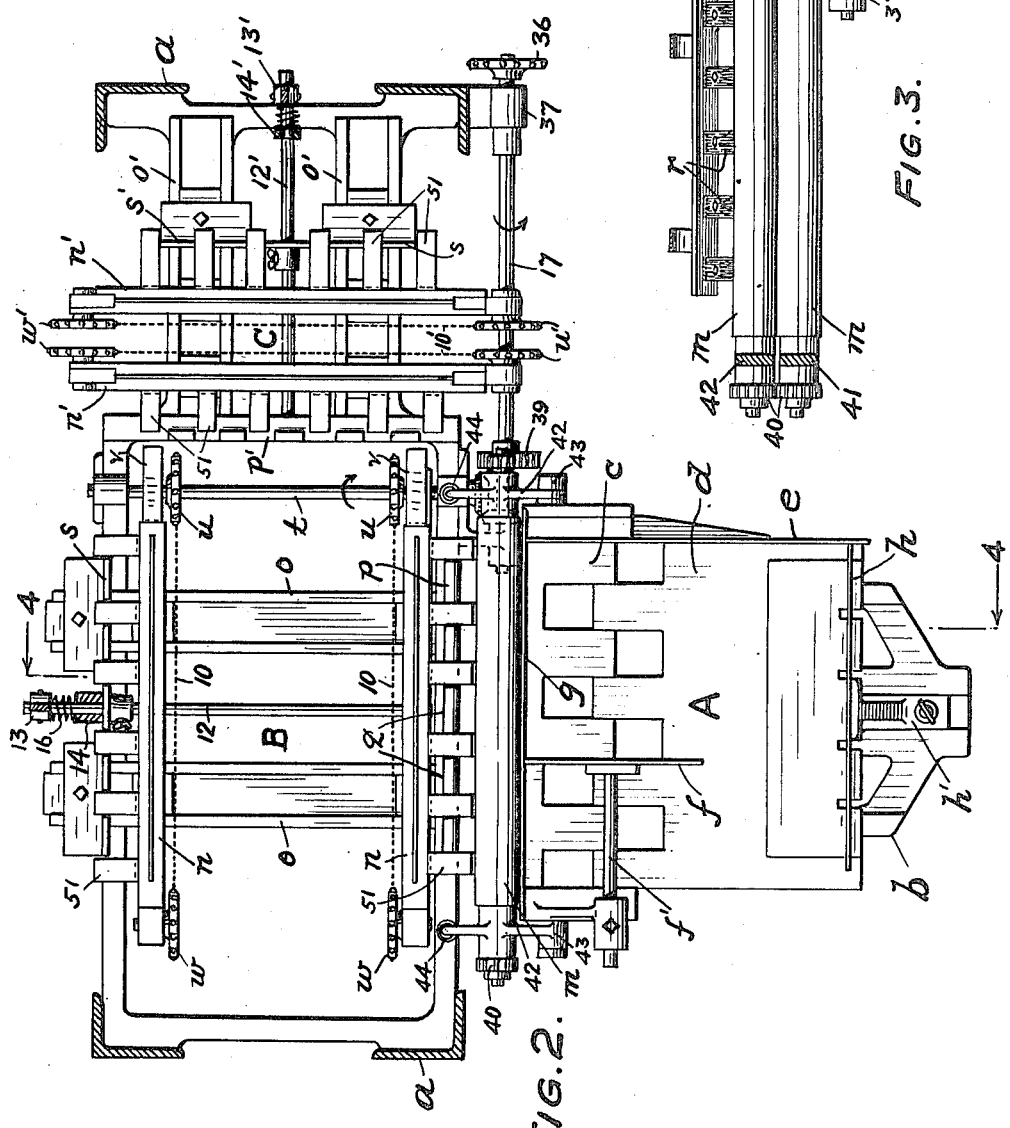

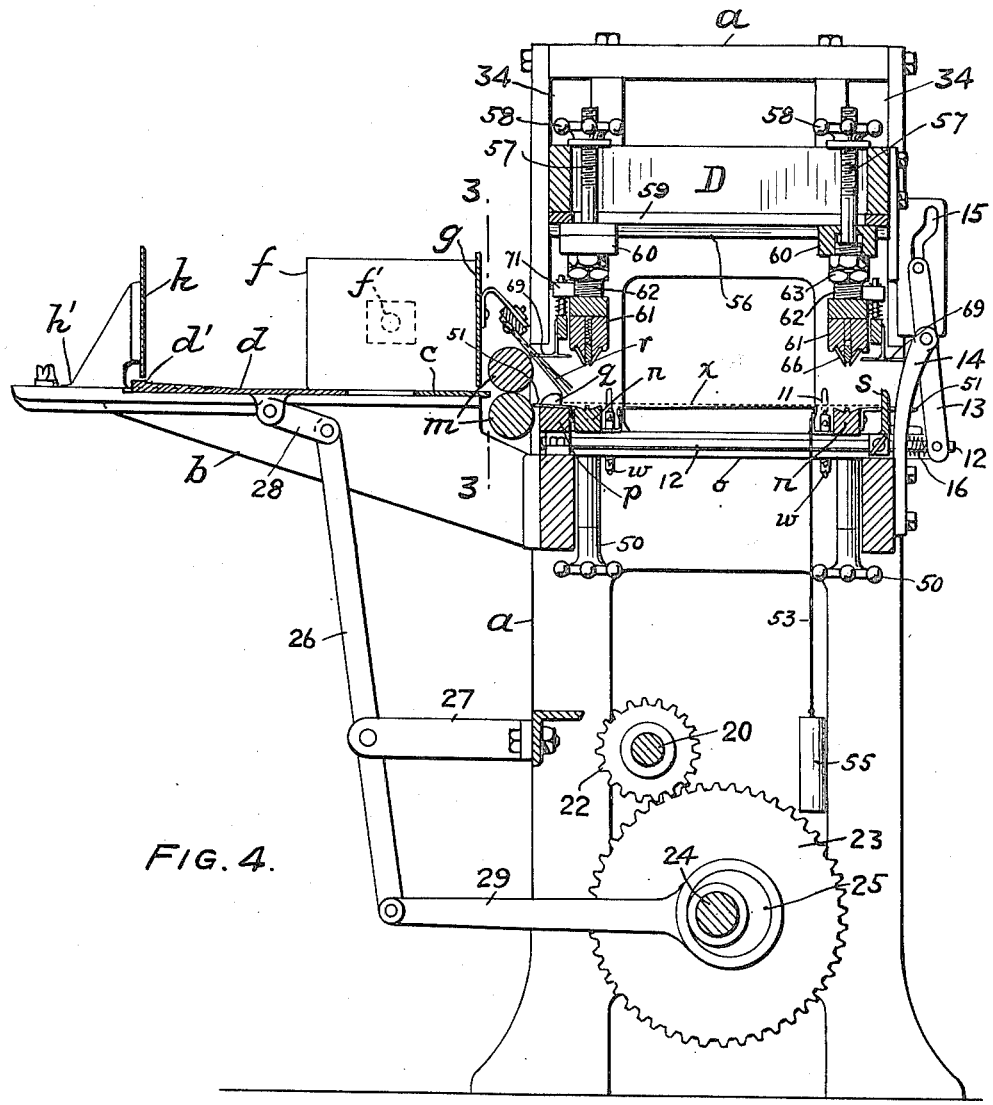
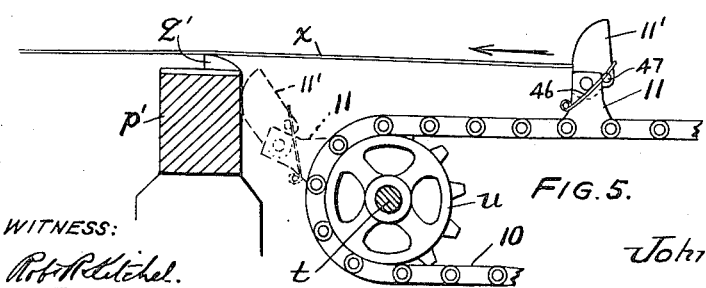

J. H. STORTZ.
MACHINE FOR CREASING CARDBOARD.
APPLICATION FILED JULY 27, 1918.

1,307,065.

Patented June 17, 1919.
6 SHEETS—SHEET 6.

WITNESS:
Rob R Kitchel.

INVENTOR
John H. Stortz
BY
Frank S. Busser
ATTORNEY.

UNITED STATES PATENT OFFICE.

JOHN H. STORTZ, OF PHILADELPHIA, PENNSYLVANIA, ASSIGNOR TO HENRY SCHMIDT & BRO. INC., OF PHILADELPHIA, PENNSYLVANIA, A CORPORATION OF PENNSYLVANIA.

MACHINE FOR CREASING CARDBOARD.

1,307,065.   Specification of Letters Patent.   Patented June 17, 1919.

Application filed July 27, 1918. Serial No. 247,001.

*To all whom it may concern:*

Be it known that I, JOHN H. STORTZ, a citizen of the United States, residing at Philadelphia, county of Philadelphia, and State of Pennsylvania, have invented a new and useful Improvement in Machines for Creasing Cardboard, of which the following is a full, clear, and exact description, reference being had to the accompanying drawings, which form a part of this specification.

My invention relates to machines for forming creases in card board or similar material for the purpose of bending to form boxes, folders, etc.

The object of my invention is to produce a machine for putting in the card board two parallel creases, simultaneously, and then putting in simultaneously two other parallel creases at right angles to the first creases, for the formation of a box or cover. Heretofore in simultaneously putting parallel creases in card board great difficulty was experienced in the drawing of the material to form the creases, the material usually being torn longitudinally between the creases by the strain.

My invention has for its main object the overcoming of this difficulty, together with novel and advantageous features of construction in the production of a machine which is entirely automatic in its operation and is capable of adjustment for different sizes and thickness of blanks.

The novel elements, together with the advantages of same, will be clearly understood from the following detailed description of my machine, in connection with accompanying drawings, in which:—

Fig. 2 is a section on line 2—2 of Fig. 1, with certain parts omitted, showing a plan view of the creasing tables, etc.

Fig. 3 is a section on line 3—3 of Fig. 4.

Fig. 4 is a vertical section of the machine on line 4—4 of Fig. 2.

Fig. 5 is an enlarged detail showing one of the collapsible fingers on carrier chain.

The machine comprises primarily a feeding hopper A (see Fig. 2), first creasing table B, second creasing table C, and a movable presser head D, together with correlated driving mechanism therefor.

Figure 6:
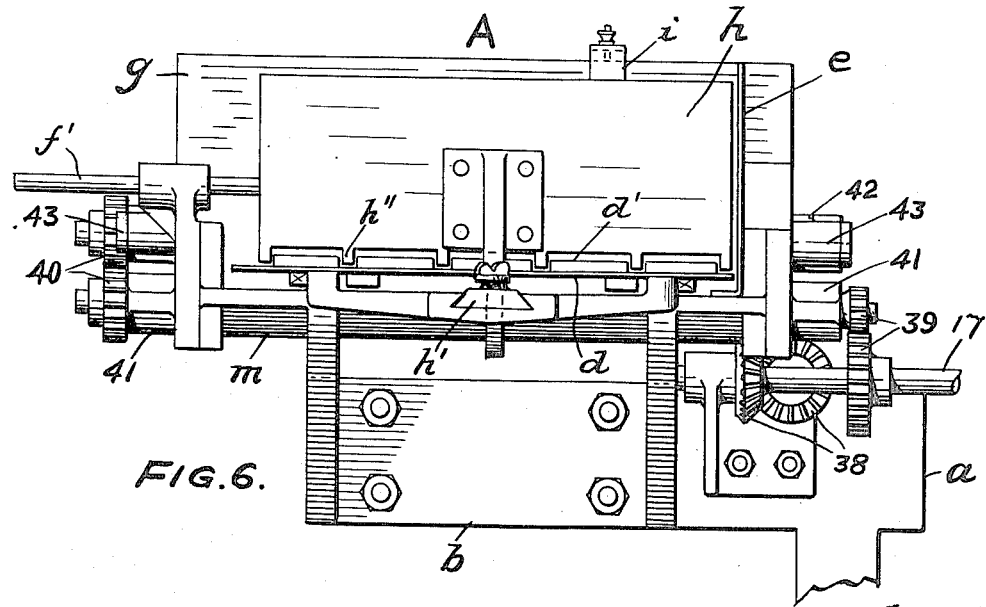
Fig. 6 is a front view of the feeding hopper and contiguous mechanism.

The feeding hopper is carried by a bracket $b$ projecting from the front of the machine frame $a$. It consists if a fixed bottom member $c$ and a sliding bottom member $d$, a fixed side $e$ and an adjustable side $f$, a fixed back $g$ and an adjustable front $h$, see Figs. 2, 6, 7. When a pile of blanks is placed in the hopper upon the two part bottom $c$—$d$, side $f$ is moved on its rod $f'$ to a distance from side $e$ to suit the width of the blanks. In a similar manner front $h$ is moved in its dovetailed slide $h'$ to a distance from the back $g$ to suit the length of the blanks.

Figure 8:
Fig. 8 is an enlarged sectional detail of one of the feeding adjustments.

Back $g$ is supported above the bottom member $c$, see Fig. 8, leaving a crack sufficiently high to allow the passage therethrough of the thickest blank likely to be used in the machine. An adjusting gage $i$ is slidably mounted on back $g$ to cut down this crack to suit the thickness of the particular blank material in use. Back $g$ has horizontal slots $g'$ for allowing gage $i$ to be moved to approximately the middle of the width of the blanks in the hopper. The lower slot $g'$ is of sufficient width to allow vertical movement of the gage. The upper slot $g'$ carries a slidable boss $j$ having an interior hole enough larger than the pin $i'$, projecting from the gage, to allow vertical movement of the latter. The gage is nicely adjustable by means of screw $k$, so that its bottom edge will allow the passage of a single blank $x$, but no more, thereunder, when the gage is fixed in this position by tightening the thumb nut on pin $i'$.

The movable bottom $d$ inclines slightly upward toward along the front where, in its initial position, it underrides front member $h$, and is provided at this edge with a slight but sharply cut ridge $d'$, which acts as a claw or rake upon the bottom sheet of the pile of blanks. When member *d* is moved rearwardly ridge *d'* carries with it the bottom sheet which in turn is allowed to move out of the hopper by gage *i* as previously described. In order to prevent any blanks being moved forwardly in the return movement of the member *d*, the front *h* is provided with depending fingers *h''*, member *d* being cut away just at these points to allow of its ridge *d'* passing beneath front *h*.

Following the course of the blank *x*, when it is pushed from the hopper as described, it is at once caught between two revolving rollers *m, m*, which feed the blank on to table B, assuming the position shown by dotted line *x* in Fig. 4. This table comprises (as does also table C) two die bars *n, n*, running crosswise of the blank, and adjustably mounted on two guides *o, o*.

Figure 9:
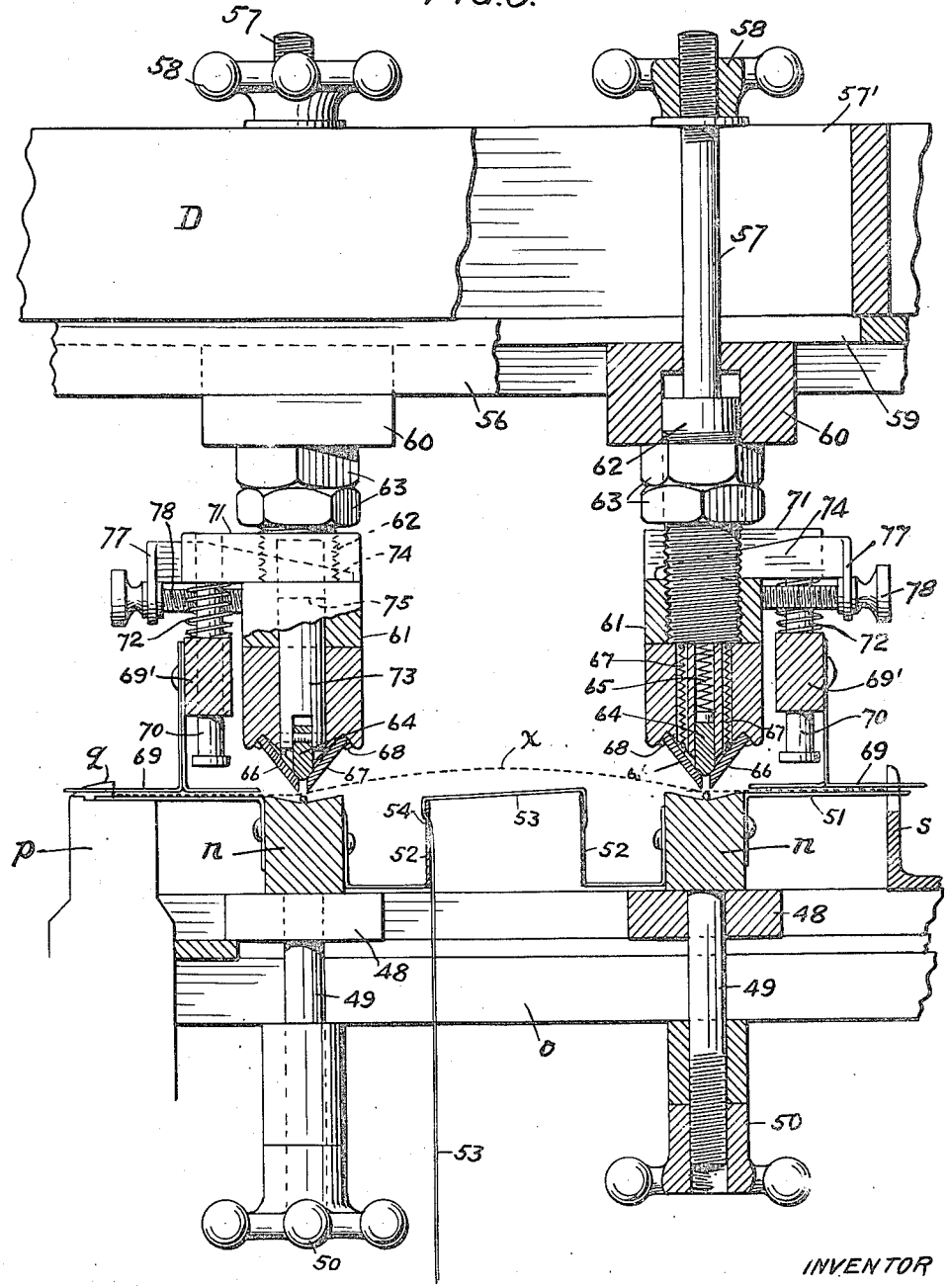
Fig. 9 is an enlarged view, principally in section, showing the creaser bars just about to act upon a blank, together with coacting parts.

As will hereinafter be described in detail, the presser head D descends forming longitudinal creases in the blank along the tops of the die bars. The top surface of each die bar slopes downward from its edges toward its center line where there is left a small ridge around which the crease in the blank is formed. This requires extra material in width and in order to prevent drawing and straining of the material, just previous to the forming of the crease by the descent of the presser bar, the blank is pressed together on its two opposite edges until it bulges up slightly as indicated by the dotted line *x* in Fig. 9. This slight bulging allows of the formation of the creases without undue strain on the material and the details of the creasing operation which occurs on table B, and on table C in a similar manner, will be described later.

The pressing together of the sides of the blank on table B is accomplished as follows. As the blank is expelled upon the table from the rolls *m* it passes over a bridge piece *p* having abutments *q* on its upper surface. Brushes *r* supported above the bridge piece press upon the moving blank and act to partly break the force of its rearward movement and also to press the front edge of the blank downward behind abutments *q* as soon as it has passed over them. The leading edge of the blank is limited in its rearward movement by the upstanding portions of an angle piece *s* slidable toward the blank on the guides *o*. As soon as the blank gets entirely over the abutments *q* this angle piece *s* is caused to move toward the blank, contacting with its rear edge and pressing it forward against said abutments. As this movement continues the blank is squeezed until it bulges up in the middle as desired, when the presser head descends and forms creases *y*, the angle piece *s* then moving out to its former position.

The angle piece *s* is caused to move in the following manner. Midway of its length the angle piece is attached to a rod 12 slidably mounted in bearings on the machine frame. Thus, by sliding rod 12 the angle piece is moved on its supporting guides *o*. The projecting rear end of rod 12 is in pivotal connection with the lower end of a lever 13, which is pivoted between its ends to a bracket 14 attached to frame *a*. The upper end of lever 13 carries a pin which is guided in a camway 15 attached to the presser head D. Camway 15 is so formed that in the descent of the presser head, just before it reaches its lower position, the upper end of lever 13 is moved outwardly pressing the lower end inwardly and moving the angle piece *s* as desired. To insure ease of action and to take up lost motion a spring 16 is confined about the end of rod 12 between the end of lever 13 and bracket 14. It also assists in retiring the angle piece out of action.

The blank, which has now been scored in one direction with parallel creases *y*, is free to move and is carried across onto table C by the following means. Supported in bearings on the frame *a* of the machine between tables B and C is a shaft *t* continuously rotated by the driving means. Two sprocket wheels *u* are feathered on shaft *t* and connected with the adjustable die bars *n* so that as said die bars may be adjusted to and from each other the sprocket wheels will move with them. Mounted in the opposite ends of die bars *n* are two sprocket wheels *w* in alinement with wheels *u*. These wheels carry sprocket chains 10, the top reaches of which are continuously moving in the direction of table C, just beneath the level of the blank on table B. Each chain 10 carries a projecting finger 11, the two fingers being in alinement with each other. Just after the creasing operation above mentioned, the chains bring these two fingers 11 into operation to move the blank across the machine and deliver it from table B onto table C. Supporting fingers *v*, attached to die bars *n*, span the break between the two tables.

Table C is similar to table B but arranged at right angles thereto. First there is a bridge piece *p'* having abutments similar to abutment *q*. When the blank passes from fingers *v* over this bridge piece it is held and pressed down by brushes *r'*, similar in construction and action to brushes *r*. The die bars *n'* on this table extending at right angles to the die bars of table B will form creases in the blank crosswise of the creases formed on table B. These die bars are slidably mounted on guides *o'*, and carry at their ends sprocket wheels *u', w'* similar to wheels *u* and *w*. Wheels *u'* are feathered on a shaft 17, which is continuously rotated, and carry chains 10', the upper reaches of which move just below the level of the blank on the table, with projecting fingers 18 thereon for discharging the blank after the second creasing operation.

When the blank has been deposited on table C by the impetus given it by fingers 11, the side edge of the blank is limited in its movement by the upstanding portion of an angle piece $s'$ similar in action and construction to angle piece $s$. That is, it carries a sliding rod $12'$ which is pivotally connected on its outer end to a lever $13'$. This lever is centrally pivoted to a fixed bracket $14'$ and carries at its upper end a pin which travels in a camway $15'$ attached to the presser head D. Thus, in the descent of the presser head both cams 15 and $15'$ act upon levers 13 and $13'$ and angle pieces $s$ and $s'$ are both pressed in and squeeze two blanks to bulge as described. The next instant both blanks are creased and in the upward movement of the preser bar the angle pieces are withdrawn and fingers 18 discharge one blank from the machine, with creases $y$ $y$ and $z$ $z$ in both directions as desired, while fingers 11 throw the second blank from table B to table C. Simultaneously, a third blank is fed from the hopper A by rolls $m$ onto table B and the process is a continuous one as long as there are blanks to work upon in the feeding hopper.

The driving mechanism for carrying on the foregoing operations will now be described. The main driving shaft 20 is carried in bearings in the frame $a$ of the machine and has on one end a driving pulley 21 which may be belted or otherwise driven from a source of power. Keyed to a shaft 20 is a pinion 22 which meshes with a gear 23 carried by a shaft 24, parallel to shaft 20, and likewise carried by bearings in the machine frame.

Midway of its length this shaft carries an eccentric 25 for operating the movable slide $d$ in the feed hopper. A lever 26 pivoted midway of its length to a bracket 27 projecting from the frame $a$ is connected at its upper end by a short link 28 with a lug depending from the feeding slide $d$. The lower end of lever 26 connects by an eccentric rod 29 with eccentric 25, so that at each revolution of shaft 24, slide $d$ makes a forward motion to feed a blank to the rolls $m$, and is returned to its original position.

On either end of shaft 24 are eccentrics 30 for operating presser bar D. Eccentric rods 31 extend upwardly from eccentrics 30, and are pivotally connected at their ends with bolts 32 on the presser bar. To avoid too great rigidity of action, that is, to afford some resilience in the pressing action bolts 32 are not directly connected with the presser bar, but have springs 33 interposed between them which allow a certain amount of give and yet are stiff enough to accomplish the creasing action as desired. It may be stated in further explanation that the presser bar extends horizontally over tables B and C, from one end to the other of the machine, and at its ends slides in ways 34 formed in the upright ends of the machine frame. The ends of the presser bar project at each side of the machine to embrace the bolts 32.

Figure 7:
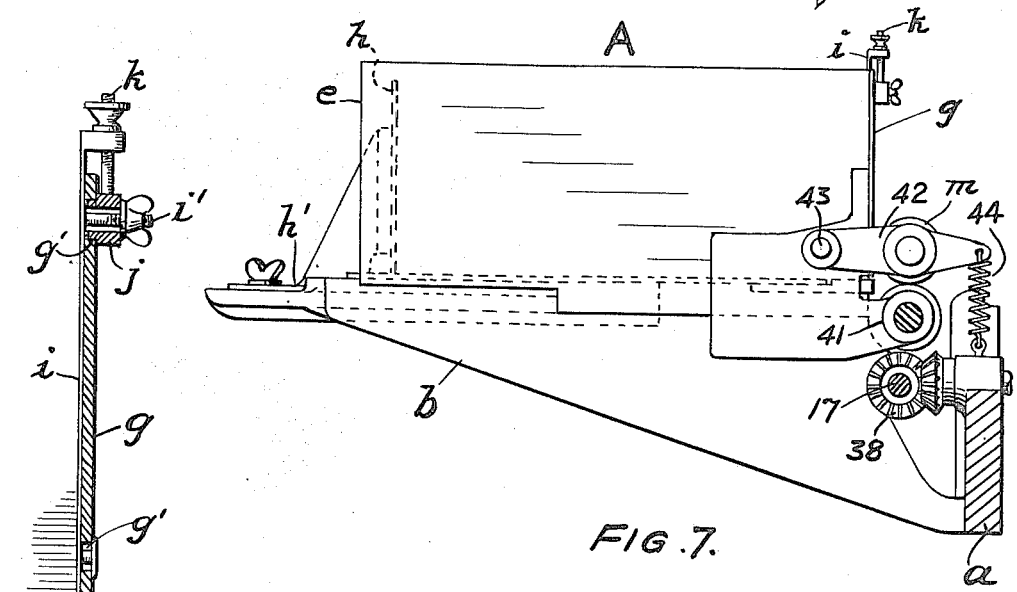
Fig. 7 is a side view of the parts shown in Fig. 6.

Shaft 20 carries a sprocket wheel which connects by a chain 35 with a sprocket wheel 36 on the end of shaft 17, already described as carrying the feathered sprocket wheels $u'$ of table C. Shaft 17 is mounted in bearings 37 on frame $a$ and is connected by miter gears 38 with shaft $t$ of table B. Thus the sprocket chains 10 and $10'$ are continuously driven from shaft 17. This shaft also drives the lower roll $m$ by reducing gearing 39. At its opposite end this roll is connected to the upper roll $m$ by equal gears 40. Thus, the rolls are both positively driven, and the direction of rotation of shaft 17 is such as to cause the rolls to feed blanks away from the hopper and onto table B. While the lower of said rolls is mounted in fixed bearings 41, the bearings for the upper roll are carried in arms 42 pivoted at each side of the hopper at 43. This allows the rolls to be separated slightly by the blanks passing between them, which is not enough to interfere with the meshing of gears 40 with each other. To insure positive action of the rolls upon the blanks and prevent slipping, their surfaces may be roughened, and also arms 42 may be pressed downward by springs 44 at their ends, as shown in Fig. 7.

In moving the blank from table B to table C it is necessary to have the conveyer chains 10 approach as closely as possible to the latter table. This causes the projecting fingers 11 to foul the bridge $p'$ when the chains carry them around sprocket wheels $u$, as indicated in Fig. 5. To overcome this difficulty, I have made these fingers in two parts, each finger 11 being short enough to clear the bridge and carrying a collapsible extension $11'$ pivoted thereto. A spring 46, sufficiently stiff for the purpose, holds this extension up to its work against a stop pin 47, but allows it to turn backward when it strikes bridge $p'$ and so continue on its circuit unimpeded.

The die bars $n$ are adjustable to and from each other and from abutments $p$, as before stated, to produce creases $y$ at any desired distance from each other. For accomplishing this, the die bars are attached to shoes 48 which are slidable along the parallel guides $o'$, two shoes to each die bar. Bolts 49 extend downward from the die bars through longitudinal slots in guides $o'$ and have hand nuts 50, whereby the bars may be fixed immovable when they have been moved to their correct positions to produce creases the desired distance apart.

To the outer side of each die bar are attached plate fingers 51, disposed horizontally, which form a part of tables B and C upon which the blanks are deposited to be creased. To the inner opposing sides of the die bars are attached fingers which support upright strips 52, disposed parallel to the bars and as close to them as the chains 10 will permit. To one of these strips 52 are attached a number of bands 53 of canvas or other flexible material, spaced apart, said bands being led across the intervening space between die bars to the other strip 52 where they pass through slots 54 and hang downward having weights 55 to hold them taut. Thus is formed a supporting means for the blanks, the horizontal reaches of the bands being at the level of the tops of bars n and fingers 51. Moreover, this flexible portion of the table accommodates itself to the adjustment of the die bars, and the weights hold it sufficiently taut to insure that when the blank lying thereon is squeezed preparatory to being creased the bulge always occurs upward.

Figure 1:
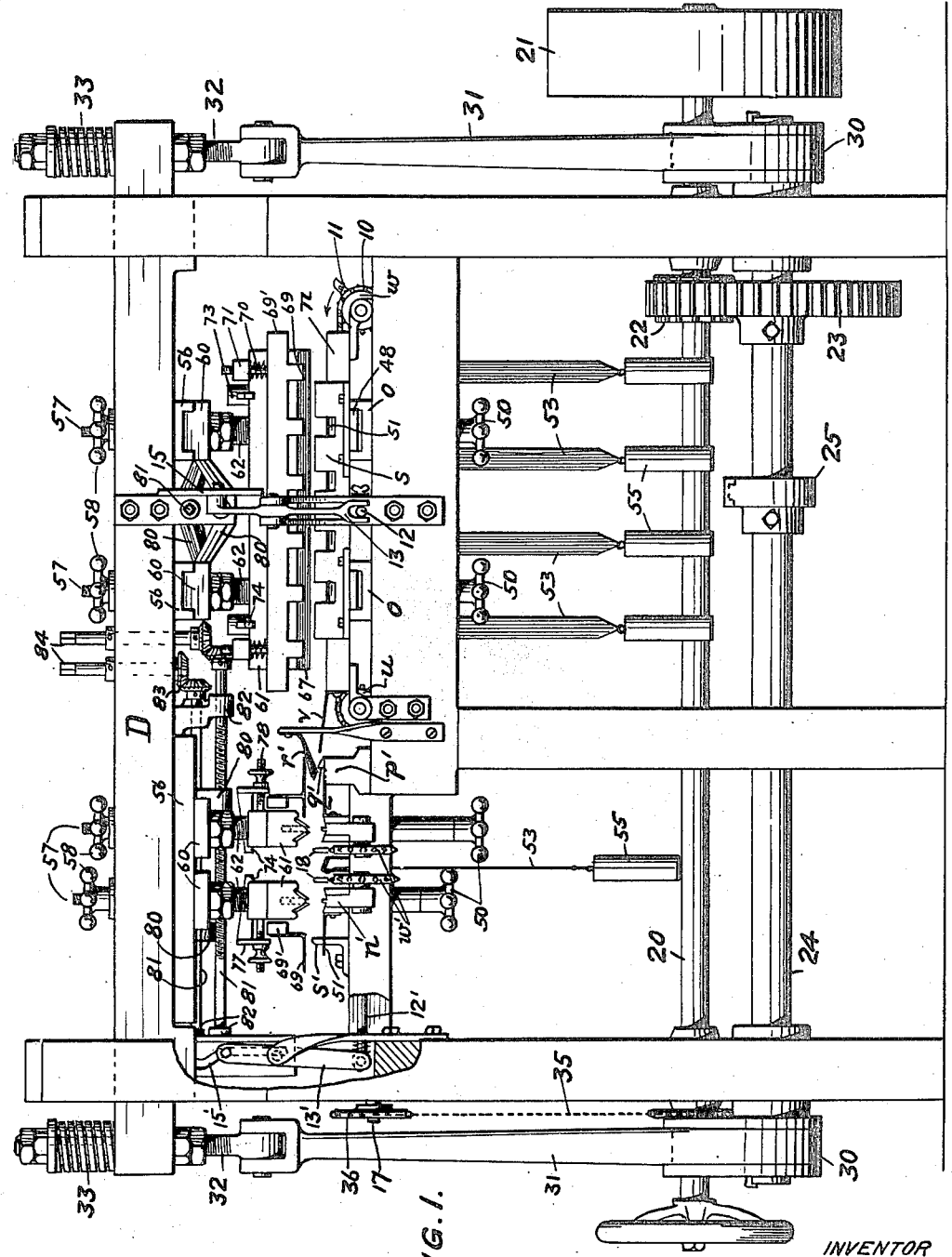
Figure 1 is a rear view of the machine, partly broken away.
Figure 10:
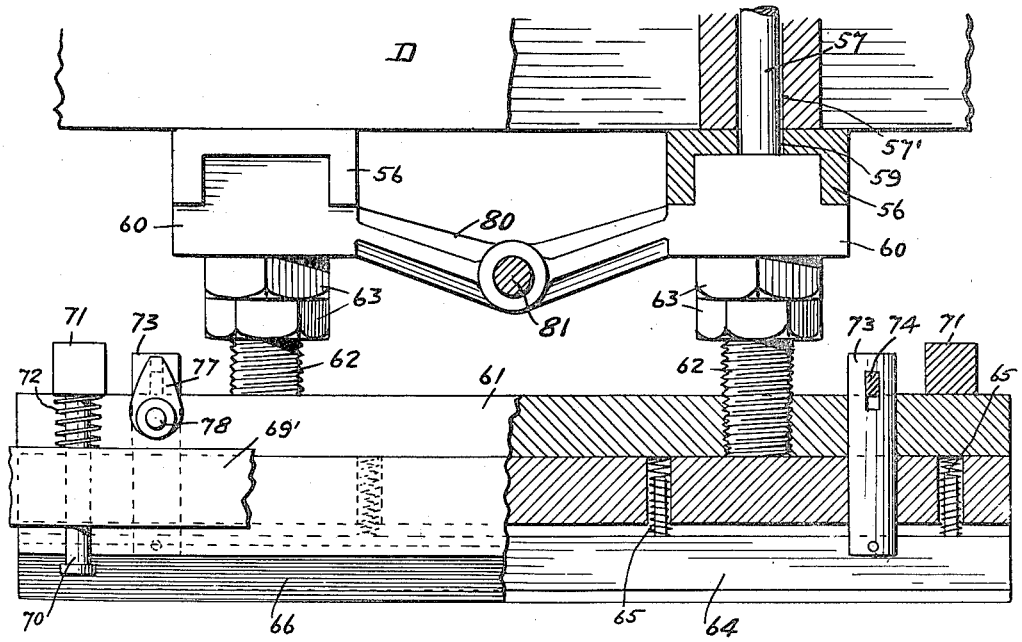
Fig. 10 is an enlarged face view of one of the creaser bars, partly in central section.
Figure 11:
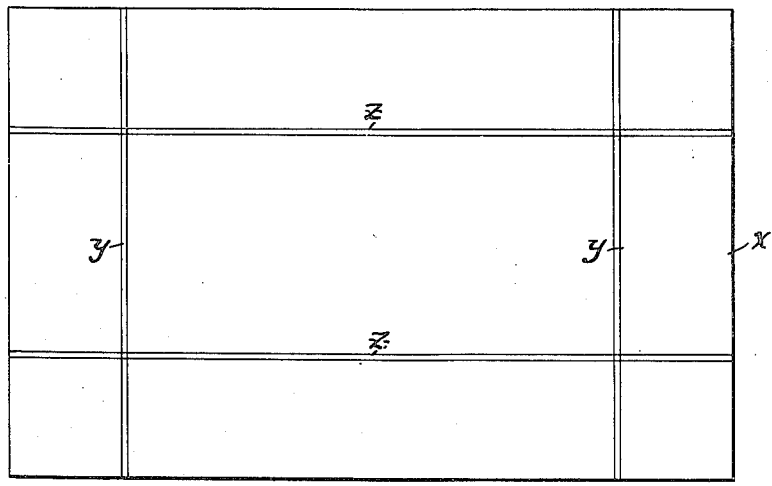
Fig. 11 is a plan view of a sample blank after it has been creased in my machine.

On the under side of presser bar D are mounted creasing devices for coacting with bars n on table B and bars n' of table C to form the creases in the blank. These devices comprise the following duplicated parts shown in Figs. 1 and 4, a set above table B and a similar set over table C, the details of which will now be described as shown in larger scale in Figs. 9 and 10.

Guides 56, similar to guides o, are adjustably attached to the under side of bar D by bolts 57 passing up through slots in bar D and secured by hand nuts 58 above said bar. Pairs of bolts 57 pass through longitudinal slots 57' in the presser bar and 59 in guides 58 and through blocks 60 slidable along the under side of said guides, whence they project and support creaser bars 61. The lower parts 62 of the bolts are enlarged and threaded to receive nuts 63. The threaded nuts 58 and 63 afford vertical adjustment of the creaser bars relative to the die bars with which they are in vertical alinement.

Each creaser bar has a vertical longitudinal slot in its under side in which works a plunger bar 64, pressed downward by springs 65. This bar is supported in its slot, directly over the longitudinal ridge in the underlying die bar, by vertical bolts 73 which extend upward through orifices in the creaser bar and project above, where they are slotted and pierced by tapered keys 74. The slots 75 are deep enough to allow the creaser bar and studs to be raised, but springs 65, intermediate of bolts 73, keep pressing them normally downward, hanging upon the keys.

Figure 12:
Fig. 12 is an enlarged cross-section through a crease.

Inclined plates 66 are supported beneath each creaser bar by light tension springs 67. The upper edges of these plates rest in longitudinal V-slots in the creaser bar, and from these converge downward to the rounded lower edge of the plunger bar 64. The lower edges of the inclined plates have beveled parallel faces normally held a distance apart somewhat greater than the width of the ridge on the die bar. Thus, in the descent of presser bar D each creaser bar descends upon its die bar and plates 66 press the interposed blank down either side of the ridge on the die bar, producing the inverted U-shaped crease shown in Fig. 12. Small pins 68 retain the upper edges of plates 66 in their V-slots, and in the creasing operation the plates turn slightly in these slots as on hinges, forcing central bar 64 upward, and bringing their parallel beveled faces closer together, to definitely press the crease in the blank, against the underlying ridge on the die bar. The extra material required to form the creases thus formed is provided by the bulge in the blank obtained as previously described.

To insure that in the squeezing action to produce the bulge the edges of the blank do not spring up and override the limiting abutments q and s, the creaser bars are provided with depending fingers 69, which are located vertically above the fingers 51 on the die bars. Fingers 69 are supported from longitudinal bars 69', which are slidably mounted on studs 70 depending from overhanging cleats 71 on the creaser bars. Springs 72 on studs 70 normally keep fingers 69 in lower position so that in the descent of the presser bar these fingers first contact with the blank and hold it against fingers 51 on both edges of the blank, after which the creasing takes place. Conversely in the return motion of the presser bar, the creaser bars leave the blank first, fingers 69 still holding the latter down upon the table where it belongs and preventing its being caught by plates 66 in any way and raised.

It is understood that the fingers are merely for the purpose stated, to prevent the edges of the blank from being raised off the table by suction or adhering to the creaser bars. They press lightly upon the blank and do not in any degree prevent the lateral drawing of the blank from the edges inwardly at the creasing operation.

Key 74 provides for the adjustment of plates 66 to produce a crease in connection with the ridge on the die bar to best advantage. Each key has a prolongation 77 through which passes a bolt 78 screwed into the creaser bar. Thus by turning the nut on bolt 78 the normal level of plunger bar 64 can be nicely regulated, and this determines the opening between the beveled ends of plates 66 which forms the crease.

After die bars n and n' have been correctly set on tables B and C to produce creases on the blank spaced as desired, it is necessary to move the creaser bars 61 above them until they exactly register with the crease forming ridges. To this end, the two sliding blocks 60 of each creaser bar are joined together by a casting 80, see Figs. 1 and 10. Midway between the thus-connected blocks this casting is tapped and engages a long threaded bolt 81 mounted in fixed brackets as 82. Thus by turning bolt 81 the casting 80 acts as a nut and is moved along carrying both blocks 60 and therefore the creaser bar connected with them. This provides an independent adjusting bolt for each of the creaser bars, and in order that the two over the same table shall clear each other, one of the castings 80 is offset downward and the other upward, whereby the two adjusting bolts lie parallel, one above the other, and provide a nice adjustment for the creaser bars.

These bolts 81 may be operated by prolonging them and squaring their ends for wrenches, or by the addition of miter gears 83 and vertical turning posts 84, they may be operated more conveniently from the top of the machine.

Having now fully described my invention, what I claim and desire to protect by Letters Patent is:

1. In a machine for creasing card board blanks or the like, in combination, a table provided with parallel creasing ridges, a reciprocating presser head for coacting therewith, means for operating the head and means for producing a fullness in the blank on the table between the creases to allow for the creases.

2. In a machine for creasing card board blanks or the like, in combination, a table provided with parallel creasing ridges, a reciprocating presser head for coacting therewith, means for operating the head and means for squeezing the blank on the table to produce a bulge in the blank between said ridges to allow for the creases.

3. In a machine for creasing card board blanks or the like, in combination, a fixed table and a reciprocating head, means for bringing the head down upon the table, means for feeding a single blank upon the table at each reciprocation, means for simultaneously forming parallel creases in the blank, means for squeezing the blank until it bulges centrally just prior to the crease-forming operation, and means for ejecting the creased blank.

4. A machine for creasing card board blanks or the like comprising, in combination, a stationary table and a movable presser head alining therewith, means for reciprocating the presser head to and from the table, parallel creasing ridges in said table and resilient groove-ways in the movable head coacting therewith, abutments for the blanks on both sides of the table, and means to move said abutments toward each other whereby the blanks are squeezed until they bulge prior to the creasing operation.

5. A machine for creasing card board blanks or the like comprising, in combination, a stationary table and a movable presser head, means for reciprocating the presser head to and from the table, parallel creasing ridges in said table, means to adjust said ridges to and from each other, adjustable resilient groove-ways in the movable head coacting therewith, limiting flanges for the edges of the blanks parallel to the ridges projecting above the table level to form abutments for opposite edges of the blanks, and means to reciprocate one of said abutments relatively to the other, whereby a blank upon the table is squeezed to form a bulge in said blank between abutments for the purpose of providing extra material for the simultaneous formation of creases about the ridges in the subsequent descent of the presser head.

6. A machine for creasing card board blanks or the like comprising the combination with a stationary table having parallel creasing ridges adjusted apart, a self-adjusting support intermediate of said ridges, and side-limiting flanges on the outside of and parallel to said ridges, of a movable presser head, means to reciprocate the presser head to and from the table, means connected with the presser head to cause one of said flanges to reciprocate relatively to the other as the presser head is reciprocated, and parallel creasing grooves in the presser head for coacting with the ridges in the table.

7. A machine for creasing card board blanks or the like comprising, in combination, a stationary table and a movable presser head, means for reciprocating the presser head to and from the table, parallel creasing ridges in said table, a fixed flange forming an abutment for the blanks on the outside of one of said ridges, a similar flange on the opposite side of the ridges slidable to and from the fixed flange by the reciprocating presser head, said head comprising parallel groove-ways for coacting with the ridges in the table, and horizontally disposed spring fingers on the outside of said groove-ways for coacting with similar fingers in the table in the descent of the presser bar thereon, to clamp the edges of the blank prior to the creasing operation.

8. A machine for creasing card board blanks or the like comprising, in combination, a stationary table and a movable presser head, means for reciprocating the presser head to and from the table, parallel creasing ridges in said table, a fixed flange forming an abutment for the blanks on the outside of one of said ridges, a similar flange on the opposite side of the ridges slidable to and from the fixed flange by the reciprocating presser head, said head carrying parallel groove-ways for coacting with the ridges in the table, each groove-way comprising a longitudinal spring-pressed top member and longitudinal sides formed by the beveled lower edges of two spring-supported plates, hingeably socketed at their upper edges and converging downwardly so that their beveled edges underlie the resilient top member and are spaced apart somewhat farther than the width of the coacting ridge in the table, and downwardly sloping surfaces on either side of said ridge whereby in the creasing operation the top of the groove-way gives upwardly and allows the sides to be pressed in together against the sides of said ridge, creasing the blank between them.

9. A machine for creasing card board blanks or the like comprising, in combination, a hopper for the blanks, a creasing table provided with parallel transverse ridges, means for conveying a single blank from the hopper to said table, means for squeezing the blank on the table until it bulges between said ridges, a reciprocating presser head carrying groove-ways for coacting with said ridges to form creases in the blank and means for ejecting the blank after the creasing operation.

10. A machine for creasing card board blanks or the like comprising, in combination, a hopper for the blanks, a creasing table provided with parallel transverse ridges, means for conveying a single blank from the hopper to said table, means for squeezing the blank on the table until it bulges between said ridges, a second creasing table disposed at right angles to the first table, parallel longitudinal ridges therein and means for squeezing a blank until it bulges therebetween, means for transferring a blank from the first table to the second table, a reciprocating presser head carrying groove-ways for coacting with said ridges to form creases in the blank, and groove-ways in the presser head for forming creases in connection with the longitudinal ridges whereby in the descent of the presser head parallel creases may be formed in two blanks simultaneously, transversely in one and longitudinally in the other.

11. A machine for creasing card board blanks or the like comprising, in combination, a hopper for the blanks, a table containing parallel crease-forming ridges, a reciprocating claw member in said hopper for ejecting a blank onto the table, a fixed abutment, brushes for pressing the blank down behind said abutment, a sliding abutment, a presser head for descending upon the table and coacting with the crease-forming ridges, means on the presser head for moving the sliding abutment toward the fixed abutment, and means for actuating the presser head and the reciprocating claw member.

12. A machine for creasing card board blanks or the like comprising, in combination, a hopper for the blanks, a table containing parallel crease-forming ridges, feed rolls, a reciprocating claw for presenting a blank to the feed rolls, abutments on either side of the table, a presser head for descending upon the table and coacting with the crease-forming ridges, means such that in the descent of the presser head the abutments are moved relatively closer, and driving means for the presser head, feed rolls and reciprocating claw.

13. In a machine for creasing card board blanks or the like, in combination with a creasing table and a reciprocating head and means for bringing the head down upon the table to form parallel creases, together with abutments for the edges of the blank parallel with the creases and means for moving the abutments toward each other at each reciprocation, of a hopper for the blanks having adjustable side and front members for conforming to the size of the blanks and a longitudinal opening for the ejectment of a blank, provided with an adjustment for regulating the height of said opening to allow only a single blank to be ejected therethrough at each reciprocation.

14. In a machine for creasing card board blanks or the like, in combination with a creasing table and a reciprocating head and means for bringing the head down upon the table to form parallel creases, together with abutments for the edges of the blank parallel with the creases and means for moving the abutments toward each other at each reciprocation, of a hopper for the blanks, spring-pressed feed rolls for delivering single blanks from the hopper to the table, and actuating means for the rolls.

15. In a machine for creasing card board blanks or the like, in combination, a table provided with parallel creasing ridges, a reciprocating presser head for coacting therewith, means for squaring up the blank on the table with respect to the ridges, means for producing a bulge in the blank to allow for the creases, and means for operating the presser head.

16. In a machine for creasing card board blanks or the like, in combination, parallel creasing devices and means for delivering a blank and positioning it over the creasing devices, complementary creasing devices and means to reciprocate them toward and from the blank overlying the first named creasing devices, means to adjust the creasing devices of each pair to vary their distance apart, and a support for the blank between the first named creasing devices and operable in the adjustment of the latter to expand or contract laterally, thereby affording a support whose dimensions vary with the distance between the creasing devices.

17. In a machine for creasing card board blanks or the like, in combination, parallel creasing devices and means for delivering a blank and positioning it over the creasing devices, complementary creasing devices and means to reciprocate them toward and from the blank overlying the first named creasing devices, laterally extending weighted straps forming a support for the blank between the creasing devices, means to adjust the creasing devices to vary their distance apart, and means operable in the adjustment of the creasing devices to draw said straps laterally against said weights when the creasing devices are adjusted to increase the space between them.

18. In a machine for creasing card board blanks or the like, in combination, parallel creasing devices and means for delivering a blank and positioning it over the creasing devices, complementary creasing devices and means to reciprocate them toward and from the blank overlying the first named creasing devices, means to produce a bulge in the blank between the creasing devices, and means to hold flat, during the creasing operation, the parts of the blank outside the creasing devices.

19. In a machine for creasing card board blanks or the like, in combination, parallel creasing devices and means for delivering a blank and positioning it over the creasing devices, complementary creasing devices and means to reciprocate them toward and from the blank overlying the first named creasing devices, means to produce a bulge in the blank between the creasing devices, means to hold flat during the creasing operation the parts of the blank outside the creasing devices; said holding means comprising supports upon which said parts of the blank rest, fingers movable with the complementary creasing devices and engaging the blank from above, and springs yieldingly holding the fingers against the blank.

20. In a machine for creasing card board blanks or the like, parallel creasing devices, means for sliding a blank laterally over the creasing devices, a laterally extending abutment over which the blanks are thus slid and which prevents retraction of the blanks when positioned for creasing, and yielding brushes adapted to press the rear edge of the blank down as it overrides the abutment.

21. In a machine for forming card board blanks or the like, the combination with feed mechanism for inserting the blanks into the machine, of means adapted to straighten and register the blanks, further means for forming a bulge centrally in the blank, said bulging means being adapted to allow the creasing means to draw on the extra material in the bulge, and means for ejecting the creased blank.

22. In a machine for creasing card board blanks or the like, the combination with means for making two creases in a piece of material, of means whereby a bulge is given the material between the creasing means, said bulging means being adapted to allow the creasing means to draw on the extra material in the bulge, to prevent rending of the material.

23. In a machine for creasing card board blanks or the like, the combination of means for making two parallel creases simultaneously in a piece of material, means adapted to bulge the material, and means for causing said bulge to form centrally between the creasing means to allow for the creases.

In testimony of which invention, I have hereunto set my hand, at Philadelphia, Pa., on this 23rd day of July, 1918.

JOHN H. STORTZ.